(12) United States Patent
Metten et al.

(10) Patent No.: US 8,196,360 B2
(45) Date of Patent: Jun. 12, 2012

(54) PHOTOVOLTAIC SOLAR ROOF TILE ASSEMBLY SYSTEM

(75) Inventors: Erich Christian Metten, Surrey (CA); Timothy James Roddick, Vancouver (CA); Jason Leonard Scultety, Vancouver (CA)

(73) Assignee: MSR Innovations Inc., British Columbia (CA)

( * ) Notice: Subject to any disclaimer, the term of this patent is extended or adjusted under 35 U.S.C. 154(b) by 1234 days.

(21) Appl. No.: 11/643,825

(22) Filed: Dec. 22, 2006

(65) Prior Publication Data
US 2007/0157963 A1    Jul. 12, 2007

Related U.S. Application Data

(60) Provisional application No. 60/758,185, filed on Jan. 12, 2006.

(51) Int. Cl.
*E04D 13/18* (2006.01)

(52) U.S. Cl. ....... 52/173.3; 52/586.1; 126/623; 136/244

(58) Field of Classification Search ................. 52/173.3, 52/200, 22, 251, 586.1, 586.2, 582.1, 656.1, 52/65, 726.2; 136/251, 244; 126/623, 704
See application file for complete search history.

(56) References Cited

U.S. PATENT DOCUMENTS

| | | | |
|---|---|---|---|
| 4,321,416 A | 3/1982 | Tennant | |
| 5,014,488 A | 5/1991 | Evangelos et al. | |
| 5,084,255 A | 1/1992 | College et al. | |
| 5,575,861 A | 11/1996 | Younan et al. | |
| 6,065,255 A | 5/2000 | Stern et al. | |
| 6,065,256 A * | 5/2000 | Joko et al. | 52/173.3 |
| 6,075,202 A | 6/2000 | Mori et al. | |
| 6,111,189 A * | 8/2000 | Garvison et al. | 136/244 |
| 6,119,415 A | 9/2000 | Rinklake et al. | |
| 6,201,180 B1 | 3/2001 | Meyer et al. | |
| 6,269,596 B1 | 8/2001 | Ohtsuka et al. | |
| 6,369,315 B1 | 4/2002 | Mizukami et al. | |
| 6,465,724 B1 | 10/2002 | Garvison et al. | |
| 6,617,507 B2 | 9/2003 | Mapes et al. | |
| 6,672,018 B2 | 1/2004 | Shingleton | |
| 6,856,496 B1 | 2/2005 | Mucci et al. | |
| 7,012,188 B2 * | 3/2006 | Erling | 136/251 |
| 7,102,074 B2 | 9/2006 | Yen et al. | |
| 2003/0015636 A1 | 1/2003 | Liebendorfer | |

(Continued)

FOREIGN PATENT DOCUMENTS

CA           746203          11/1966

(Continued)

*Primary Examiner* — William Gilbert
(74) *Attorney, Agent, or Firm* — Clark & Brody

(57) ABSTRACT

The invention provides a modular system that includes a composite tile, with or without integrated photovoltaic cells, a track system for assembly of the tiles to a structure, and a wiring system for the photovoltaic tile. The track and tiles are made of composite material. Molding and extrusion processes can be used for the manufacturing of the tile and track, including the integration of photovoltaic cells. The track lengths are fastened to the structure. The track and tile have mating features, such that the tile can be interlocked with the track. Adjacent tiles are installed with overlap. Photovoltaic cells can be molded into or assembled with the tile. A busbar or wire harness is assembled to the track. When the photovoltaic tile is interlocked with the track, the connectors of the photovoltaic cells engage the busbar or wiring harness to provide an electrical connection.

14 Claims, 13 Drawing Sheets

U.S. PATENT DOCUMENTS

| | | |
|---|---|---|
| 2003/0015637 A1 | 1/2003 | Liebendorfer |
| 2003/0070368 A1* | 4/2003 | Shingleton .................. 52/173.3 |
| 2005/0166955 A1 | 8/2005 | Nath et al. |
| 2006/0032527 A1 | 2/2006 | Stevens et al. |
| 2009/0019796 A1* | 1/2009 | Liebendorfer ............... 52/173.3 |

FOREIGN PATENT DOCUMENTS

| | | |
|---|---|---|
| CA | 1077226 | 9/1977 |
| CA | 1248582 | 8/1984 |
| CA | 2219026 | 10/1997 |
| CA | 2335159 | 6/1999 |
| CA | 2301420 | 9/2001 |
| CA | 2445799 | 11/2002 |
| EP | 0 625 802 | 11/1994 |
| EP | 0 625 802 A2 * | 11/1994 |
| JP | 11-204819 | 7/1999 |

* cited by examiner

PHOTOVOLTAIC SOLAR ROOF TILE ASSEMBLY SYSTEM

This application claims priority from provisional patent application No. 60/758,185 filed on Jan. 12, 2006.

BACKGROUND INFORMATION

There are numerous methods available for affixing photovoltaic cells to residential and commercial roofing structures. The most common photovoltaic roofing product consists of a stand-alone solar panel, which mounts to an existing roof or structure, using frame supports or direct mounting to the structure. These products are used in addition to, and not in place of, existing roof structures. The wiring systems for these photovoltaic arrays use traditional parallel or series circuits, and standard crimp or lug type connections.

In terms of standard roofing products, there are various examples of interlocking shingle type products made from a range of materials, including plastic, foam, and metals. These materials have been used in place of more traditional shingle material, such as baked clay, slate, cedar, and asphalt. While these alternative materials compensate for the weaknesses of the traditional designs, such as dimensional instability, weight, and environmental concerns, they do not provide a solution to problems associated with traditional installation methods. The installation methods for the plastic or resinous shingles are similar to traditional shingle installation methods, in that they use nails to affix the tiles to the roof directly or to the roofing battens. Typical products of this type, for example, can be found in the following Canadian Patent Nos. 746,203, 2,301,420, and 2,219,026.

With the popularity of photovoltaic roofing systems increasing year to year, there have been a number of products introduced that combine the plastic material shingles with integrated solar cells. The solar cells can be photovoltaic, or in some cases provisions are included in the tile to provide solar heating of water channels for building hot water supply. For photovoltaic systems, stand alone panels have been developed to mount to existing roof structures. In the cases where the photovoltaic cell has been mounted to a shingle, the installation methods remain traditional, in that the entire system is either nailed or screwed to the roof structure. The electrical wiring methods for these systems involve standard industry connectors and harnesses. Typical products of this type can be found in the following Canadian Patent Nos. 2,335,159, 1,248,582, and 1,077,226, and U.S. Pat. No. 6,856,496.

Photovoltaic systems and the use of alternative materials in roofing products have been able to achieve commercial success in niche markets. An apparent shortcoming of prior known systems is that all inter-panel and inter-shingle wiring connections as well as any feed connections from the panels to the house has had to be performed manually and on a one-by-one basis.

The assembly of photovoltaic systems to building structures has resulted in a number of products that use rail or track type systems to structurally attach photovoltaic panels to building structures or roofs. These products advantageously use the rail systems as raceways or conduits for the photovoltaic wiring. The use of metal or plastic rails allows for a structural framing and attachment method for the photovoltaic panels while providing enclosed pathways to environmentally protect the electrical systems. An apparent disadvantage to the rail systems is that the assembly of the photovoltaic panels is accomplished either with mechanical fasteners or chemical bonding. The electrical wiring of these systems are traditional wiring harnesses and connectors, and do not provide a solution to simplifying the installation of the photovoltaic systems to a building structure. Typical products of this type can be found in the following U.S. Pat. Nos. 6,065,255, 6,111,189, 6,465,724, 6,672,018, and 7,012,188.

The combination of continuous lengths of rail that act as a busway to interconnect photovoltaic panels has been considered in U.S. Pat. No. 6,201,180. This design provides a solution to transforming the electrical output of a photovoltaic panel from DC current to AC current. The design of this busway enables the electrical connection of photovoltaic panels using plug receptacles that mate to an electrical conduit and can interconnect multiple independent photovoltaic panels. While this system provides a solution for electrical interconnectivity of photovoltaic panels, it does not provide a structural fastening system for photovoltaic roof tiles.

SUMMARY OF THE INVENTION

There is thus a need to combine scaleable technologies to provide a simple and modular installation for a roofing or other structural product. A further need relates to the effective integration of photovoltaic cells with such a product for electricity generation. The seamless integration of a photovoltaic cell with a composite material tile and modular installation system can be a key commercial product that can combine renewable energy alternatives and recyclable material concepts with a highly flexible design.

In a first embodiment, the inventive tile and track assembly is designed for use in a structure that employs tiles for a particular reason. One example of such an application is a structure that requires a roof. Here, the tile and track assembly provides an efficient and cost effective way to mount the tiles to the structure to form the roof. While a roof is exemplified, the tiles could be mounted as part of a wall or other structure as well.

A second embodiment of the invention addresses the needs for a scaleable and modular system that can effectively integrate a photovoltaic cell. The inventive tile and track assembly can be combined with a photovoltaic cell, and in particular to an application wherein the photovoltaic cell-containing tile and track assembly are employed as a roofing structure. By using composite materials, the composite tile can be molded to tight dimensional control using molding manufacturing processes, for example derived from the automotive sector. These composite materials may be combined with recycled polymers to reduce waste through scrap recycling. The flexibility of molding materials will allow the use of many additives that can overcome problems associated with traditional roofing products. Fire retardant agents can be added to reduce the likelihood of the product igniting in extreme conditions. Additional agents can be added to ensure weather ability is maintained while discouraging the formation of moss or organic material. Use of polymer materials result in a very lightweight structural product, which will allow for easier and safer handling and installation. It further greatly reduces transportation costs as compared to traditional roofing products. Alternatively, a metallic material may be used for the track, possibly in combination with a polymer material, for example by using co-extrusion manufacturing processes.

The tile according to one mode of the invention is designed with a snap lock feature in at least one location, preferably at least two locations. The snap lock feature will allow for a simple installation on to a track, which may also be made from composite polymer material and may be advantageously made by extrusion. The snap lock engages the track in such a way that the tile is positively retained, and the tile is securely held to the track but can slide in the longitudinal direction of the track. The use of the track makes the installation simple and modular, as the tiles can simply be snapped in place, and can slide relative to the track as necessary. Installation to the building structure is through the track, which can be easily nailed or screwed onto existing structures or roofs, possibly using a jig to maintain the proper track-to-track distance on the building structure. As the track can be made by extruding polymer materials, the dimensional cross-section of the track can be very tightly controlled, permitting a very tight fit with the tile snap lock. The extrusion process will further allow the track to be manufactured continuously, and any desired length can be provided. Lengths can also be butted together to maintain continuity. As with the tile, the track can be molded using resinous materials with recycled content and any necessary fillers to ensure structural integrity and weather ability.

The use of composite material and the track installation method system can be effectively combined with a photovoltaic system. The use of high precision molding processes allows the possibility for over-molding or insert molding of the photovoltaic cell (or solar cell). This can provide a structurally strong and sealed cavity for the photovoltaic cell, such that the cell is adequately secured to the tile. The flexibility of this tile design also allows the possibility of assembling a separate photovoltaic module within the tile. The same basic concept is used for the track: a bus bar or wiring cable may be arranged on the track, for example co-extruded with the track, to provide an electrical connection for the photovoltaic composite tile. By including a lug, prong, or pierce-type connector on the underside of the photovoltaic cell, the connector may reside below the composite tile and engage the extrusion wire or bus bar when the tile is snapped in place on the track. Alternatively, the electrical connector for the photovoltaic cell may be provided by the snap lock, with the snap lock having at least two prongs, each prong can be arranged to be removable and fastened to make electrical contact with a bus bar or wiring cable of the track. The prongs may be of the pierce type as described above.

In the case when a track is butted together with another track, interconnection pieces may be used to electrically connect the bus bar/wiring cable of one track to the bus bar/wiring cable of the adjacent track. The interconnection pieces may also be used to provide structural rigidity to the joint between two tracks.

A combination of these elements into an effective and modular photovoltaic and/or composite tile roofing system is provided by one embodiment of the invention. By using composite materials molding processes, the tile and track can be manufactured to high tolerances to ensure a tight and robust fit, and a sealable tile to tile interlocking system to prevent water ingress. This is a clear advantage over traditional roofing products, where less precise manufacturing processes necessitate the use of a high degree of overlap to ensure fit and sealing are maintained. This requirement effectively reduces the useable area of the product, meaning more product has to be used to cover a surface. The tile according to the invention overcomes this and maximizes the useable area. The molding processes also permit a high degree of design flexibility; tiles may be of various textures, patterns, colours, or sizes if necessary. Traditional products generally do not permit the same level of design flexibility.

By using a track, the installation of the tile and photovoltaic system is far simpler and modular as compared to existing photovoltaic and composite panels or tiles. The track lengths may be easily fastened to the structure, optionally in marked locations by using a jig, for instance. Once in place, the tile or photovoltaic tile may be snapped into place on the track. Adjacent tiles of the same row of tiles snap into the same track, and are located to overlap in an interlocking fashion. The overlap necessary to form a weatherproof seal between two tiles is small for a tile arrangement according to the invention compared to the overlap necessary when using traditional tiles. With the photovoltaic cell in place, the connection of the electrical system may be accomplished through the same track, using bus bar or wiring cable connections. The advantages of this system over existing roofing systems and photovoltaic systems are numerous. The tile and track are lightweight, and the cost of transportation and handling will be far lower than for heavy asphalt or shake products. Installation time is greatly reduced, as only the lengths of track need to be fastened to the roof structure, as opposed to individual tiles or photovoltaic panels traditionally requiring mechanical fastening to a roof structure. By including the electrical system in the track, there is no need for separate wiring harnesses or complicated wiring bundles to be routed below the roofing structure, as found in many existing photovoltaic roofing systems.

As mentioned above, the tile and track system can be advantageously used on other structures. The interconnectivity of the tile to the track system can be used in an assortment of other arrangements, such as the walls of a building, and support photovoltaic tiles or other standard tiles. In these applications as well as a roofing application, the tiles can form part or the entire roof, wall or the like depending on the structure design. The flexible design of the system allows for assembly to any structure where the track can be securely fastened to the structure. The invention is capable of other embodiments and can be used in other constructions where the ease of installing a photovoltaic tile to a structural surface via the track interlock would be considered as an advantage.

DRAWINGS

In drawings that illustrate embodiments of the invention,

DETAILED DESCRIPTION OF THE INVENTION

Figure 1:
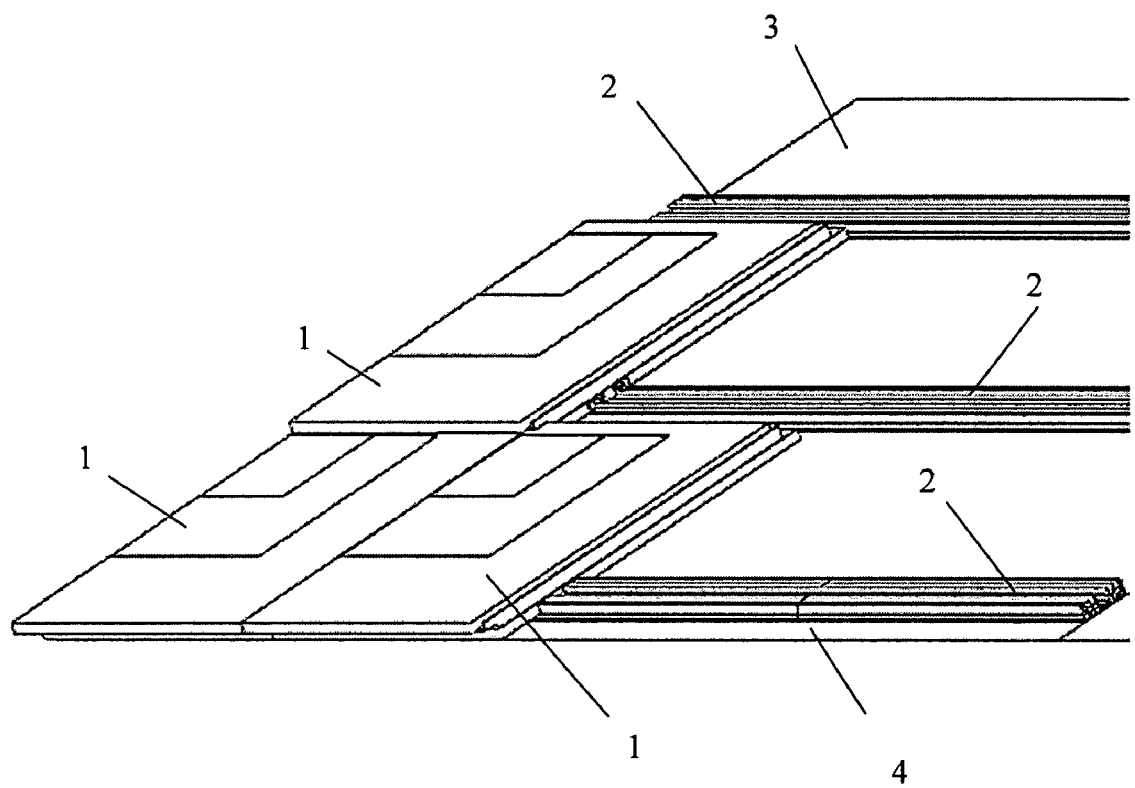
FIG. 1 is a diagram showing one embodiment of the arrangement of three tiles and tracks on a roofing structure.

As shown in FIG. 1, a number of tiles (1) are affixed to a roofing structure (3) using a track system (2). The track system is either nailed or screwed to the roof structure, in locations marked by the installer to position the composite tiles vertically. Pre-cut lengths of track can be installed beside each other to form one continuous length of track by butting the track together (4) and fastening each free end down. Alternatively, a clip connector as would be known in the art may be designed to secure the ends of mating track to each other. The tiles are snapped into place on the extruded track and can be removed or slid along the longitudinal direction of the track. Adjacent tiles advantageously overlap each other as shown in FIG. 1. A sufficient number of tiles and track are assembled to the roofing structure to achieve the coverage desired.

Figure 2A:
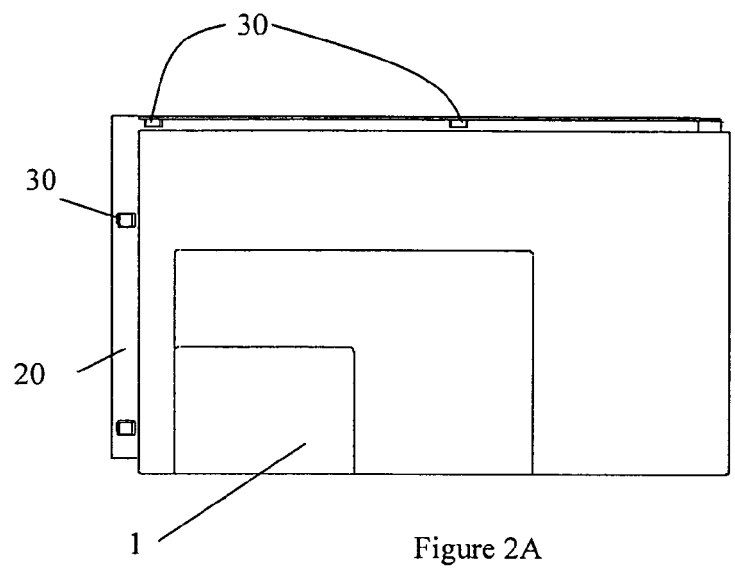
FIGS. 2A to 2C show one embodiment of a layout of a tile product.
Figure 2C:
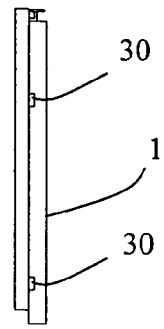
Figure 2B:
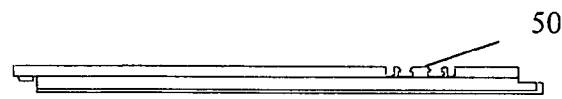

FIG. 2A shows the tile (1). The features of the tile include a ledge (20) with bosses (30) that allow for overlap mating of adjacent tiles. An edge view of the tile (1) is shown in FIG. 2B and shows the tile snap lock (50) details. The tile snap locks engage the track, as will be discussed below. A side view of the tile is shown in FIG. 2C. The bosses (30) aid during installation by providing the user with and alignment feature, each boss fits into the channel of the mating tile. This feature further provides a shear-proof connection between adjacent tiles.

Figure 3:
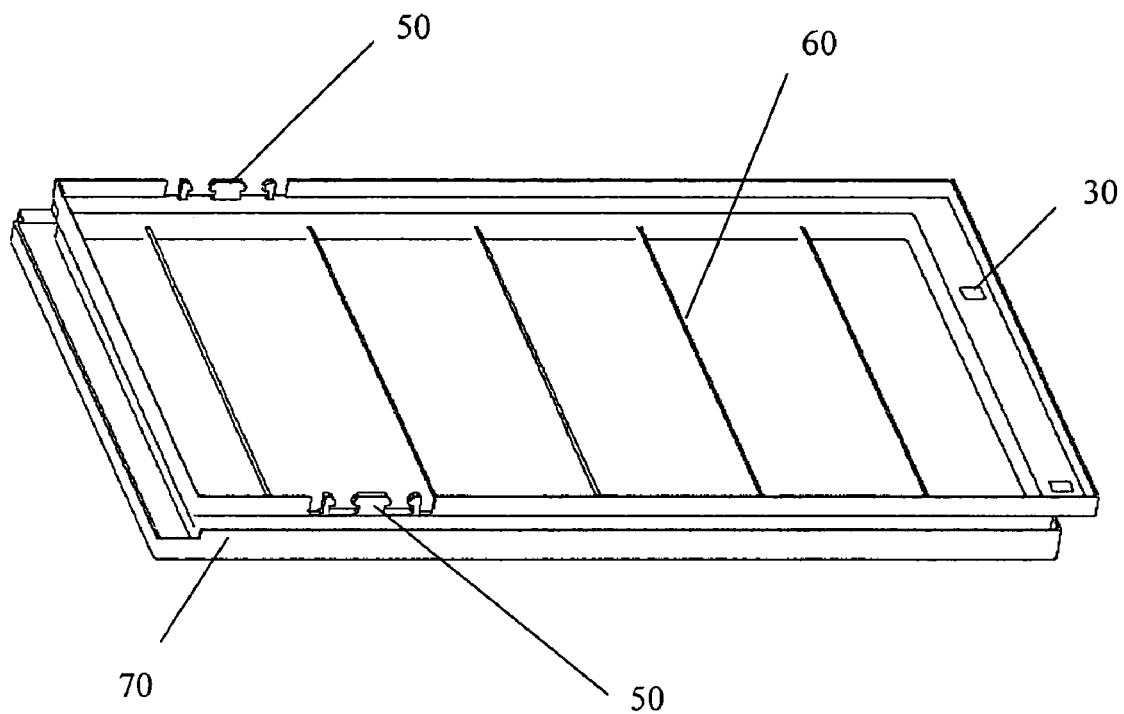
FIG. 3 shows one embodiment of an underside of the tile product.

FIG. 3 is an isometric view of an underside of the tile shown in FIGS. 2A to 2C. The tile snap lock (50) and the ledge bosses (30) are shown. Internal ribs (60) may be provided as necessary for structural rigidity of the tile. A wall (70) of the tile overlaps adjacent tile walls (not shown) to prevent water ingress between adjacent tiles.

Figure 4A:
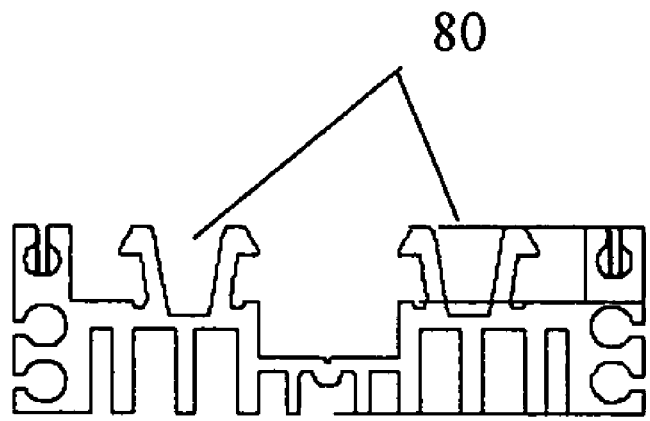
FIGS. 4A and 4B show one embodiment of a layout of the track.
Figure 4B:
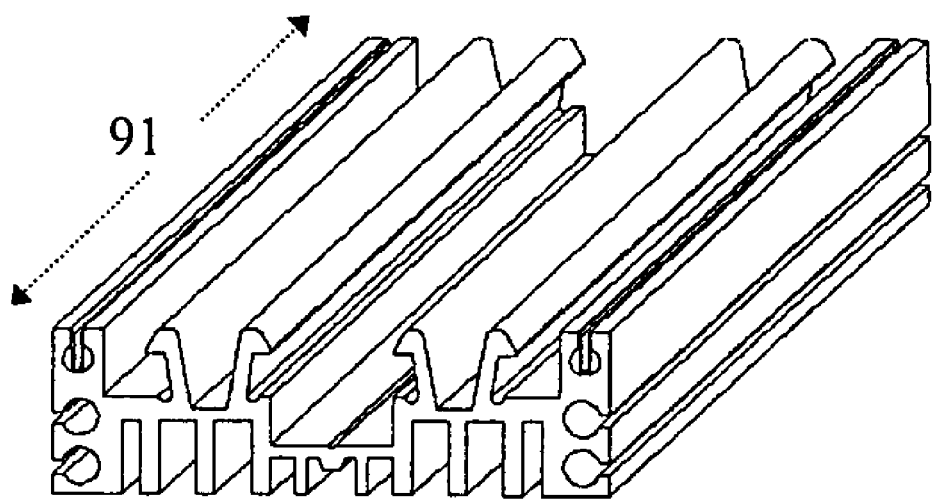

FIG. 4A shows a cross-sectional or edge view of the track (2). The track snap locks (80) arranged on the extruded track engage the tile snap locks (50) of the tile as shown in FIGS. 2A to 3. An isometric view of the track (2) is shown in FIG. 4B. The track length in a longitudinal direction (91) of the track is variable, and can be customized based on particular needs or the need for standardized lengths. It is understood that the length (91) shown in FIG. 4B is for illustration purposes only and that the invention in use would necessitate a very long length (91) in comparison to the width of the track (2).

Figure 5A:
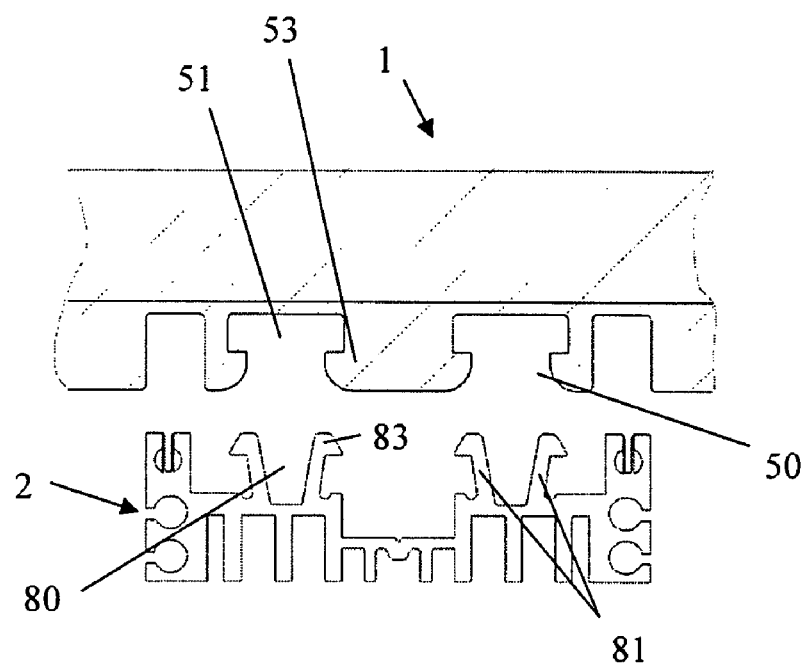
FIGS. 5A to 6 show one embodiment of the engagement of the track to the tile.
Figure 5B:
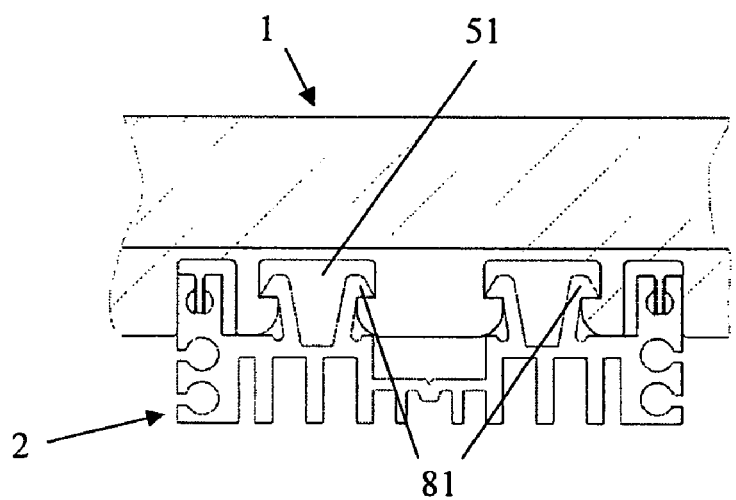
Figure 6:
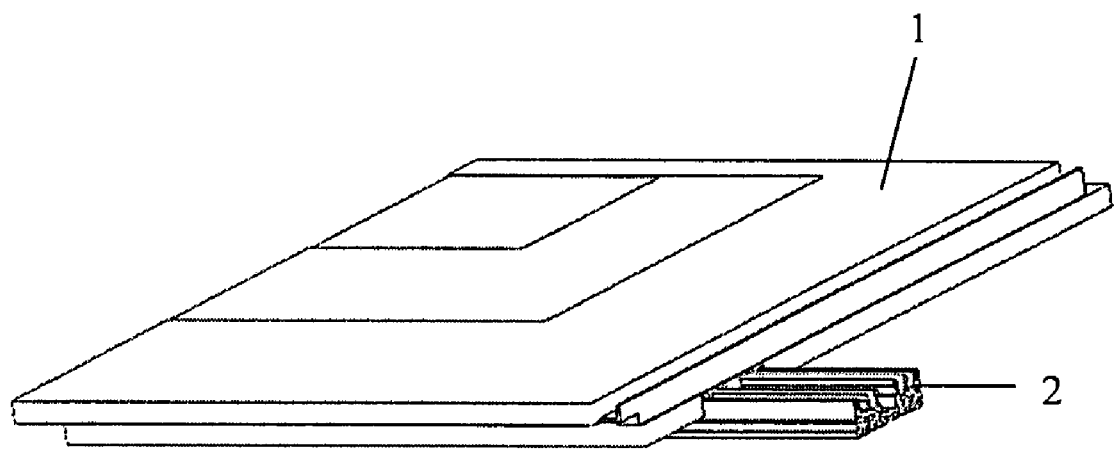

In FIG. 5A, a magnified cross sectional view of the tile (1) and track (2) engagement is shown. The tile snap lock (50) and track snap lock (80) cross sections are shown before engagement. The tile snap lock (50) includes recess (51) with lips (53). The snap lock (80) includes a pair of prongs (81), each with a lip (83). FIG. 5B shows the tile and track after engagement, the tile (1) is shown mated to the track (2). In this embodiment of the invention, the lips (53) of the tile snap lock (50) deflects the prongs (81) of the track snap lock (80) during installation. When fully seated, the prongs (81) of the track snap lock (80) spring back in the recess (51), with the lips (53) and (81) engaging each other to securely retain the tile to the track. To remove the tile, the tile could be slid out of the end of the track. Alternatively, the tile could be manipulating while applying a force to separate the prongs from the lips. FIG. 6 shows an isometric view of the tile (1) engaged to the track (2). Such snap locks are known in various arts, any suitable snap lock configuration may be used for the invention that would permit the fastening and sliding action between the tile and the track. As an example, the prongs could be on the tile and the recess could be found in the track. Other means for slidably fastening the tile and track could also be employed. For example, the tile and track could be appropriately grooved so that the tile could slide along the track. The grooving could have a channel that would allow the tile and track to be linked by a fastener, with the fastener maintaining the connection between the track and tile, the fastener also sliding in the channel during movement of the tile with respect to the track. In this embodiment, the fastener would take the place of the engagement of the lips to maintain connection between the track and tile.

Figure 7A:
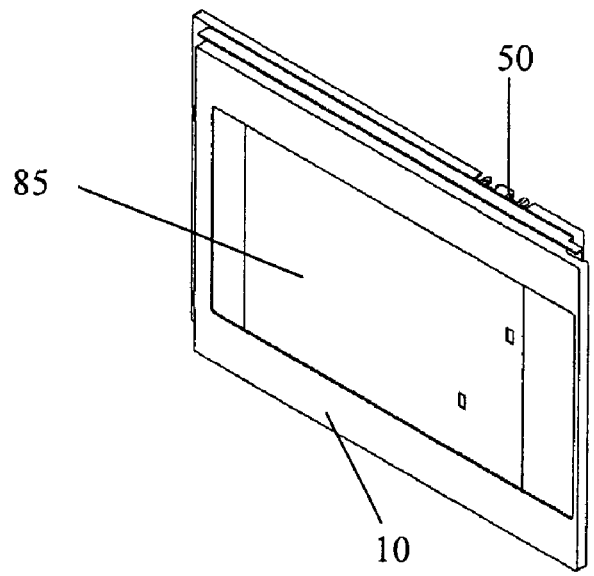
FIGS. 7A to 8 show one embodiment of the tile with the integrated photovoltaic cell.
Figure 7B:
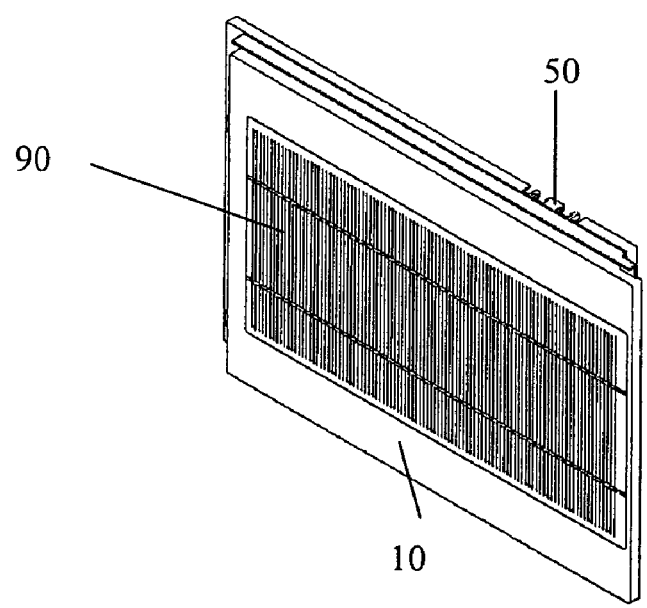
Figure 8:
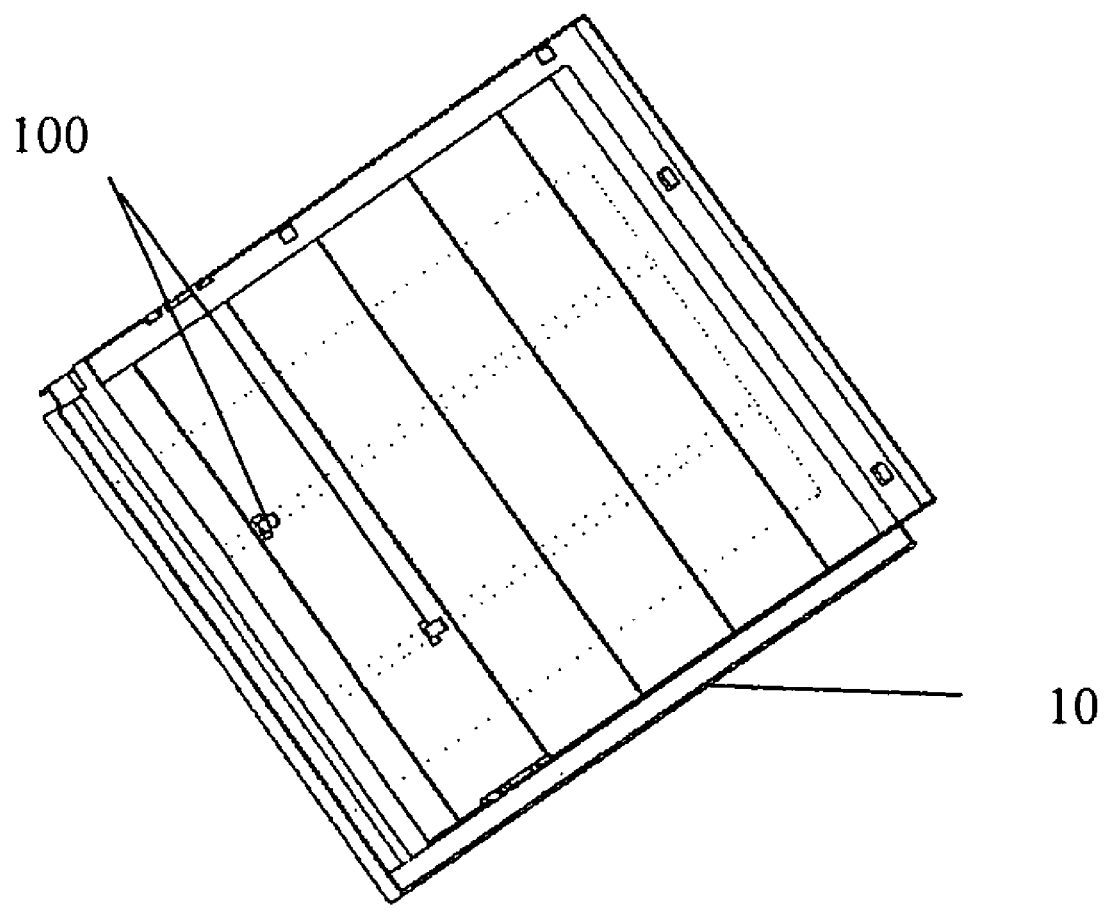

A transparent PV tile (10) with a rear mounted integrated photovoltaic (PV) cell (90) is shown in FIGS. 7A to 8. As is shown in FIG. 7A, the PV tile (10) has a recess (85) to accommodate the photovoltaic cell (not shown). FIG. 7B shows the photovoltaic cell (90) mounted in the recess (not shown) of the PV tile (10). All further features of the PV tile (10) are identical to those of the previously shown tile (1) and share the same reference numbers. In FIG. 8, the underside (i.e. the side facing the roof structure) of the PV tile (10) is shown having photovoltaic cell connectors (100) protruding from the PV tile (10).

Figure 9:
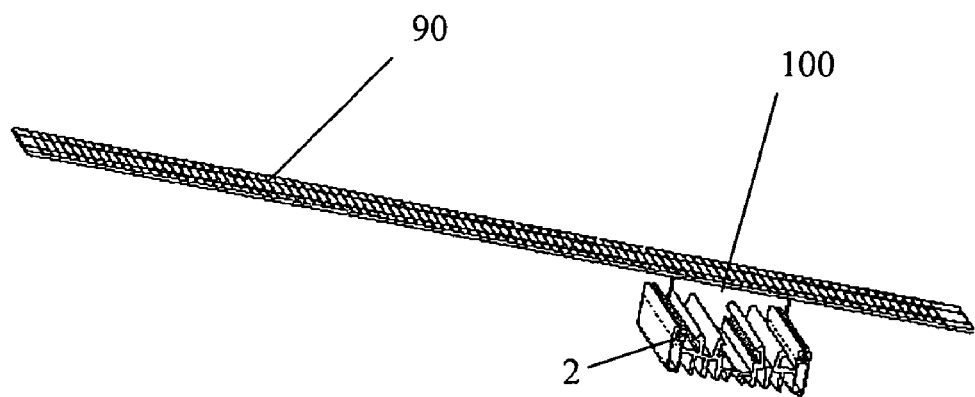
FIG. 9 shows one embodiment of the busbar and track assembly.
Figure 10:
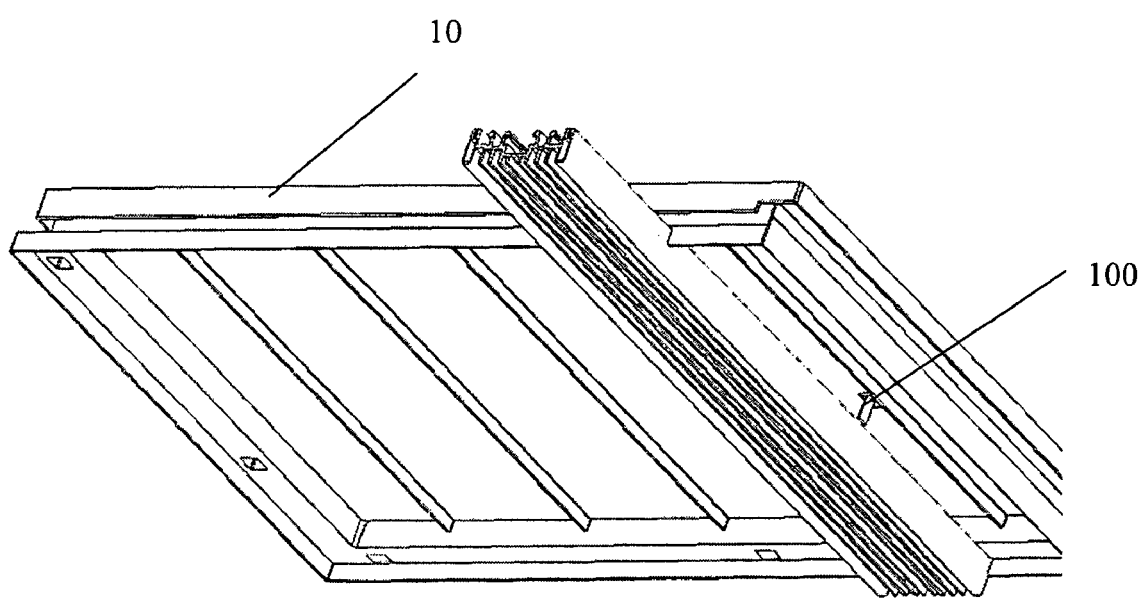
FIGS. 10 to 11B show one embodiment of the engagement of the photovoltaic tile with the busbar and track.

FIG. 9 shows a track (2) similar to that shown in previous Figures. A photovoltaic cell (90) is attached to the track, for example via a terminal connection (100). FIG. 10 shows an underside isometric view of the PV tile (10) engaged to the track (2). The photovoltaic cell (not shown) is electrically conductively connected through a mechanical fit of the photovoltaic cell connectors (100) to the busbar (110 as shown in FIG. 9).

Figure 11A:
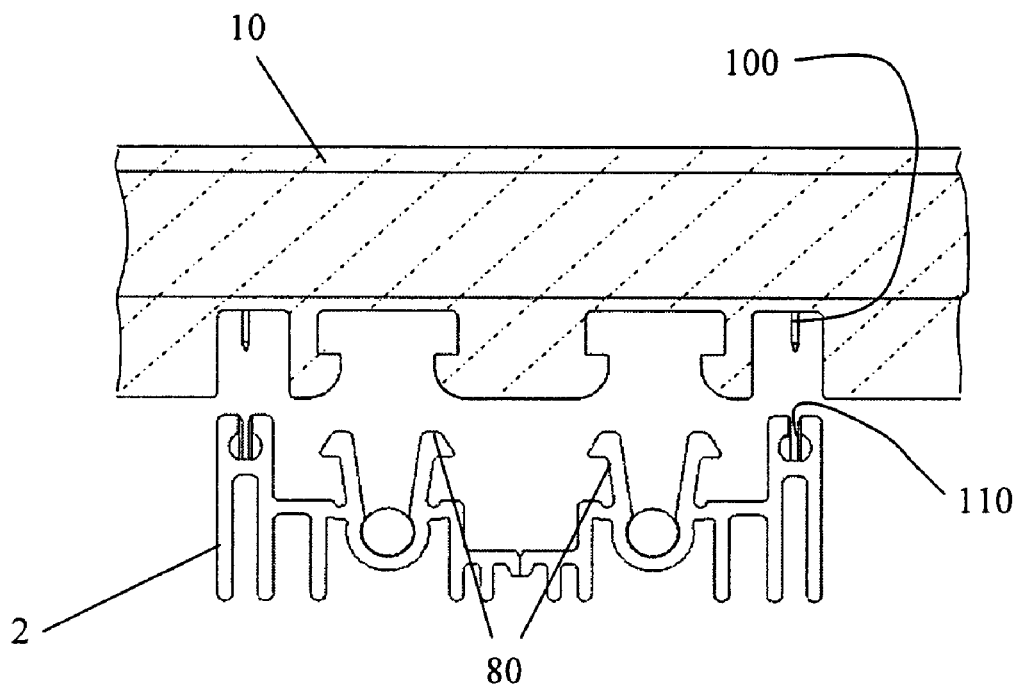
Figure 11B:
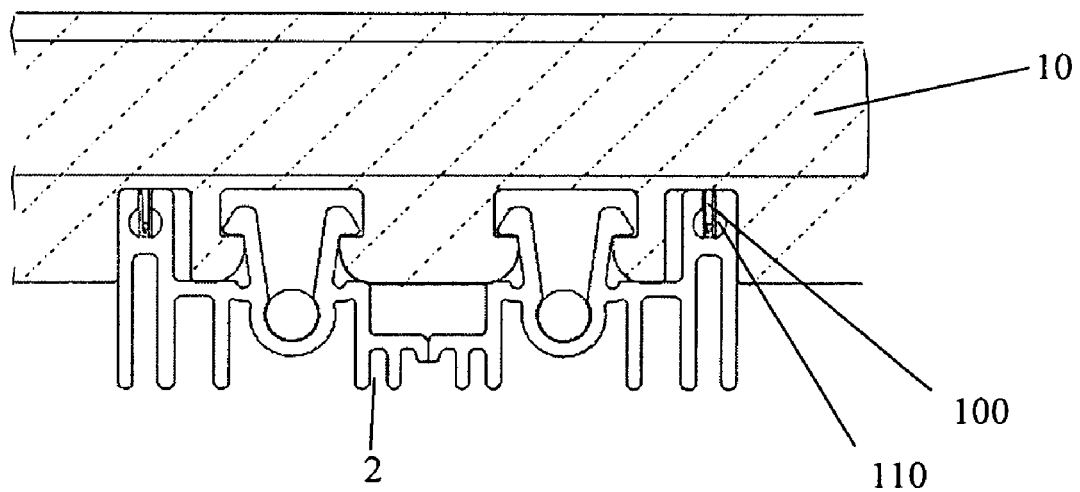

FIG. 11A shows the PV tile (10) and the track (2) with the busbars (110) before engagement. FIG. 11B shows the PV tile (10) and the track (2) with the busbars (110) after engagement. The photovoltaic cell connectors (100) engage the busbar (110). The engagement of the tile to the track is accomplished similarly to what has been shown in FIGS. 5A and 5B. With the busbar (110) assembled to the track, as shown in FIG. 9, the photovoltaic connectors (100) engage the busbar through a mechanical and electrical connection. In the same way that the tile snaps to the track, the photovoltaic connectors push into the busbar connections when the tile is pushed into place on the track. The PV tile (10) is thus removably and slidably connected to the track (2).

Figure 12A:
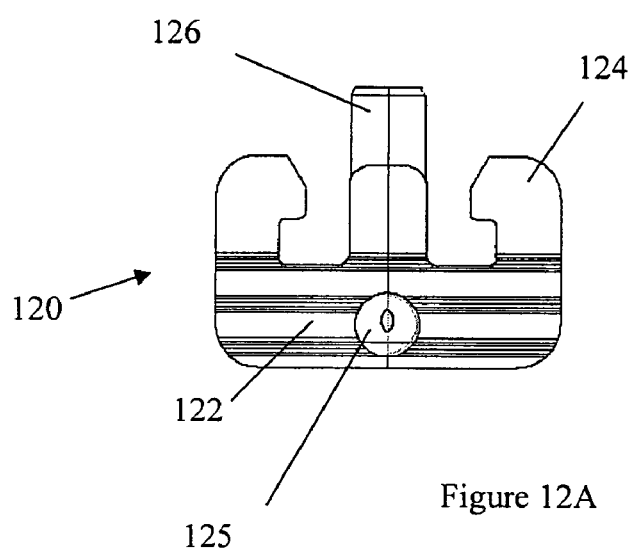
FIGS. 12A to 13 show one embodiment of the engagement of the tiles to a wiring harness of the track.
Figure 12B:
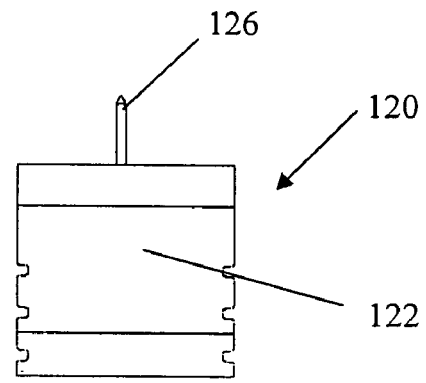
Figure 12C:
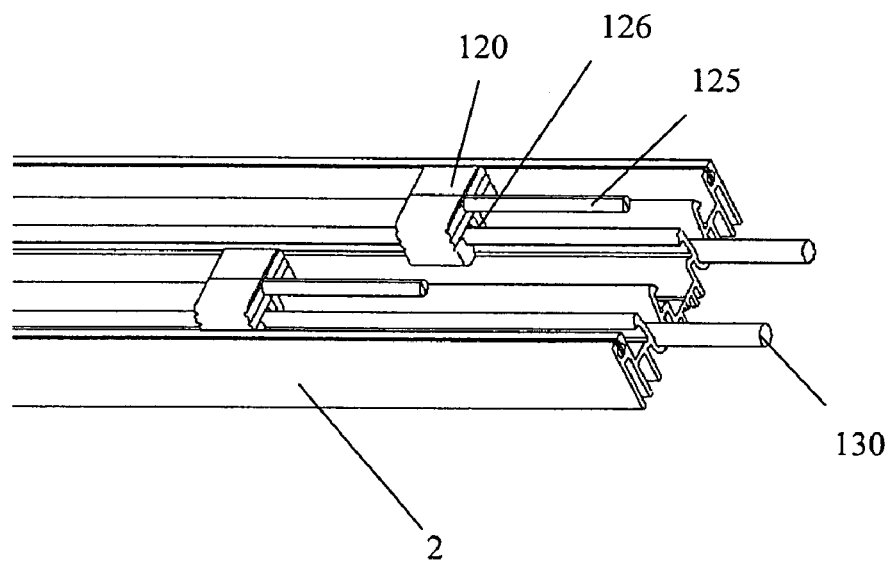

FIGS. 12A to C show one embodiment of a connector assembly (120) used for the connection of the PV tile to an integrated wire harness (130). The connector assembly (120) is shown in the cross-sectional (FIG. 12A) and edge view (FIG. 12B). The connector assembly (120) has a body (122) with protrusions (124), two are shown for this embodiment but the number may be varied according to different shapes of the track (2) used. The protrusions are arranged to cooperate with the track to hold the connector assembly (120) securely fastened to the track. The connector assembly (120) is shown mounted to the track (2) in FIG. 12C. When the connector assembly (120) is assembled with the tile and track, a pierce contact (126) of the connector assembly (120) engages the wire harness (130) that resides in the track. Enclosed within the connector assembly (120) is the wiring connection (125) for the photovoltaic cell. The wiring connection (125) is soldered to the photovoltaic cell (not shown) and is internally connected to the pierce contact (126) that engages with the track wire harness (130).

Figure 13:
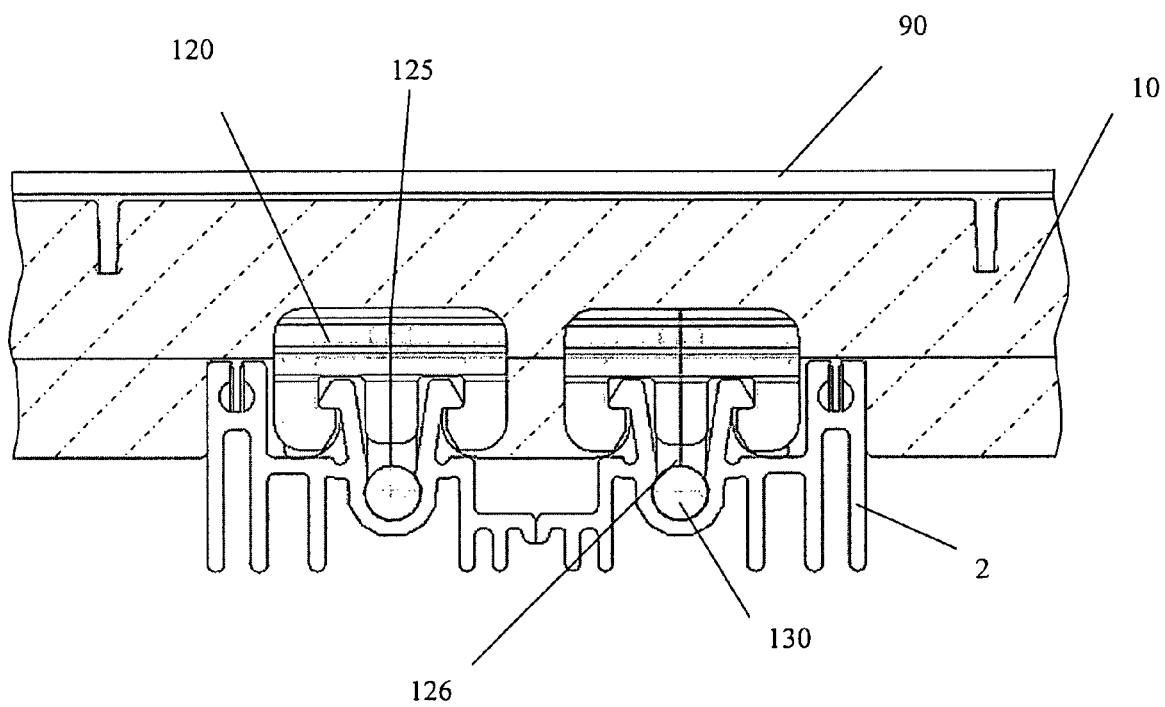

FIG. 13 shows one example of a means for electrically connecting the PV tile (10) to the track (2). This figure shows a magnified view of the PV tile (10) with an integrated photovoltaic cell (90) engaged with the track (2) that has been integrated with wiring harnesses (130). The connector assembly (120) resides between the tile and the track. The connector wiring connection (125) is soldered internally to the photovoltaic cell (90). The wiring connection (125) is connected to the pierce contacts (126) within the connector assembly (120). When the tile is engaged with the track, the pierce contacts (126) protrude into the wiring harnesses to make electrical connection between the photovoltaic cell and the wiring harnesses. Of course, other ways could be employed to electrically connect the PV tile (10) and the track (2), such as wired lugs, prongs or the like. Yet another way to convey power from the photovoltaic cells could entail a standard wiring harness and connector configuration or other suitable connection means that reside outside of the track system.

As such, an invention has been disclosed in terms of preferred embodiments thereof which fulfills each and every one of the objects of the present invention as set forth above and provides a new and improved track and tile assembly for mounting on a structure, particularly to form a roof, and contain one or more photovoltaic cells.

Of course, various changes, modifications and alterations from the teachings of the present invention may be contemplated by those skilled in the art without departing from the intended spirit and scope thereof. It is intended that the present invention only be limited by the terms of the appended claims.

We claim:

1. A tile system for covering a structure comprising:
   a tile mounting track system comprising at least one track that is fastened to the structure;
   at least one tile that includes a photovoltaic cell attached to a surface of the at least one tile; and
   means for fastening the tile to the at least one track, while allowing the at least one tile to slide along the at least one track, wherein a snap lock is used as the means for fastening, the snap lock allowing sliding of the at least one tile along the track, fastening of the at least one tile to the at least one track using the snap lock making an electrical connection to the photovoltaic cell.

2. A tile system for covering a structure comprising:
   a tile mounting track system comprising at least one track that is fastened to the structure;
   at least one tile that includes a photovoltaic cell attached to a surface of the at least one tile; and
   means for fastening the tile to the at least one track, while allowing the at least one tile to slide along the at least one track, wherein a snap lock is used as the means for fastening, the snap lock allowing sliding of the at least one tile along the track, fastening of the at least one tile to the at least one track using the snap lock facilitating an electrical connection between the photovoltaic cell and an electrical conductor using an electrical connecting means, and further
   wherein the at least one track has a first snap lock arrangement, and the at least one tile has a second snap lock arrangement, the first and second snap lock arrangements adapted to engage for fastening and sliding.

3. The system of claim 2, wherein the first and second snap lock arrangements engage each other for fastening and sliding.

4. A tile system for covering a structure comprising:
   a tile mounting track system comprising at least one track that is fastened to the structure;
   at least one tile that includes a photovoltaic cell attached to a surface of the at least one tile; and
   means for fastening the tile to the at least one track, while allowing the at least one tile to slide along the at least one track, wherein a snap lock is used as the means for fastening, the snap lock allowing sliding of the at least one tile along the track, fastening of the at least one tile to the at least one track using the snap lock facilitating an electrical connection between the photovoltaic cell and an electrical conductor using an electrical connecting means, wherein the at least one track has a first snap lock arrangement, and the at least one tile has a second snap lock arrangement, the first and second snap lock arrangements adapted to engage for fastening and sliding and further wherein the first snap lock arrangement includes at least a pair of prongs and the second snap lock arrangement includes a recess configured to receive and hold the prongs in the recess to maintain connection between the at least one tile and the at least one track.

5. A tile system for covering a structure comprising:
   a tile mounting track system comprising at least one track that is fastened to the structure;
   at least one tile that includes a photovoltaic cell attached to a surface of the at least one tile, with the at least one track having an electric conductor, the system further comprising means for electrically connecting the photovoltaic cell to the electrical conductor; and
   means for fastening the tile to the at least one track, while allowing the at least one tile to slide along the at least one track, wherein a snap lock is used as the means for fastening, the snap lock allowing sliding of the at least one tile along the track, fastening of the at least one tile to the at least one track using the snap lock facilitating the electrical connection between the photovoltaic cell and an electrical conductor using an electrical connecting means, wherein the at least one track has a first snap lock arrangement, and the at least one tile has a second snap lock arrangement, the first and second snap lock arrangements adapted to engage for fastening and sliding and further wherein the electrical connection means further comprises a connector mounted to the tile and having a third snap lock arrangement and connection pin, the first and third snap lock arrangements arranged to allow the connector to slidably fasten to the track while maintaining electrical connection between the connector pin and a busbar mounted in the track.

6. In a structure having a roof, the improvement comprising a tile system comprising a plurality of tracks that are fastened to the structure, a plurality of tiles, and means for fastening the tiles to the tracks, while allowing the tile to slide along the track it is fastened to, wherein said means for fastening and sliding further comprises a first snap lock arrangement on a portion of each track and a second snap lock arrangement on a portion of each tile, wherein each of the first and second snap lock arrangements have elements that snap together to lock the tile to the track, the elements slidable relative to each other after snapping together so that the tile can slide along the track, wherein the plurality of tracks and the plurality of tiles are arranged to form at least a part of the roof of the structure, with adjacent tiles interlocking and overlapping with respect to each other in each of a slope direction of the roof and a direction perpendicular to the slope direction, the overlapping and snap lock installation of the tiles creating a sealable tile to tile interlocking system to prevent water ingress through the roof formed by the tiles.

7. The structure of claim 6, wherein the tile system forms the entire roof.

8. The structure system of claim 6, further comprising a photovoltaic cell supported on a surface of at least one of the tiles.

9. The structure of claim 8, wherein the photovoltaic cell is attached to the surface of the at least one tile.

10. The structure of claim 9, wherein the photovoltaic cell is attached to the at least one tile by co-molding, over-molding, insert-molding, appliqué molding, or post molding adhesion, or a combination thereof.

11. The structure of claim 8, wherein at least one of the tracks has an electric conductor, the system further comprising means for electrically connecting the photovoltaic cell to the electrical conductor.

12. The structure of claim 11, wherein the electrical connecting means includes one of a separate wired lug, a prong, or a pierce connector.

13. The structure of claim 6, wherein the tiles and the tracks comprise one of a metallic, polymer, or a thermoplastic elastomer material, or a combination thereof.

14. The structure of claim 13, wherein the tiles and tracks are formed using a molding process.

* * * * *